United States Patent Office 3,376,234
Patented Apr. 2, 1968

3,376,234
PROCESS FOR CONTROLLING REACTION OF SODIUM AZIDE WITH PHENYLHALOPHOSPHINE
John E. Herweh and Algirdas C. Poshkus, Lancaster, Pa., assignors to Armstrong Cork Company, Lancaster, Pa., a corporation of Pennsylvania
No Drawing. Filed Jan. 21, 1966, Ser. No. 522,018
1 Claim. (Cl. 260—2)

ABSTRACT OF THE DISCLOSURE

The process having the utility of controlling the hazardous reaction between sodium azide and a phenylhalophosphine by admixing the azide with ¼–¾ of the stoichiometric amount of the phenylhalophosphine and adding the resulting slurry to the balance of the phenylhalophosphine maintained at a temperature in the range of 150°–180° C. to produce a moldable plastic useful in electrical insulation.

---

This invention relates to an improved process for controlling the otherwise hazardous reaction that occurs when sodium azide is brought into contact at elevated temperature with a phenylhalophosphine to form a phenylphosphinic nitride polymer.

The customary process of forming phenylphosphinic nitride polymers using sodium azide has been simply to add the azide in small increments to the phenylhalophosphine maintained at elevated temperature. The reaction is immediate and vigorous at each addition of the sodium azide. The reaction with the diphenyl compound is as follows:

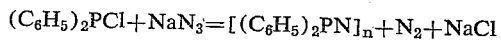

$$(C_6H_5)_2PCl + NaN_3 = [(C_6H_5)_2PN]_n + N_2 + NaCl$$

wherein $n$ most usually has the value sufficient to give a molecular weight of about 5,000 to the product. It is desirable to present a safer and more efficient means of running this reaction, particularly one that will improve the yield.

It is a primary object of the present invention to supply such a process.

This object is achieved by slurrying the sodium azide in a portion of the phenylhalophosphine, a liquid, preferably at room temperature of about 25° C. and at least below about 125° C. in order that little or no reaction will take place. The slurry is then added in a slow stream or in incremental amounts to the balance of the phenylhalophosphine which is maintained at the temperature of the reaction, normally 150°–180° C.

The sodium azide will be slurried in an amount of the phenylhalophosphine of about ¼–¾ of the stoichiometric amount needed to complete the reaction. Simple addition and stirring of the cooler slurry in the heated balance of the phenylhalophosphine will suffice. Temperature control of the reaction can be more readily obtained and yields are improved by as much as 15% above those normally obtained when the sodium azide is added as such to the hot, reactive phenylhalophosphine.

The following examples illustrate an embodiment of the invention.

Example 1

A slurry of sodium azide (0.5 mole; 32.5 grams) in phenyldichlorophosphine (0.6 mole; 107.4 grams) was added dropwise with stirring over a period of three hours to phenyldichlorophosphine (0.5 mole; 89.5 grams) maintained at 170° C. Upon completing the addition, the reaction mixture was heated at 165°–170° C. for two hours. The cooled viscous reaction mixture was taken up in benzene and the finely divided solvent-insoluble sodium chloride (27.1 grams; 0.46 mole; 92% of theory) was filtered. The filtrate was distilled to remove the solvent and unreacted phenyldichlorophosphine to give 63.3 grams of an orange-yellow glassy material for a crude yield of 80%. This material was dissolved in benzene and was precipitated by adding petroleum ether to give 30 grams of a yellow powder, M.P. 262°–275° C., identified as the phenylphosphinic nitride polymer.

Example 2

A suspension of powdered sodium azide (6.5 grams; 0.10 mole) in 11.0 grams (0.05 mole) of diphenylchlorophosphine was added in small increments to diphenylchlorophosphine (11.0 grams) at 160°–180° C. in a nitrogen atmosphere. Gas evolution ensued immediately. Since about 50% of the sodium azide remained as a sludge in the dropping funnel, three portions of o-dichlorobenzene (total of 30 ml.) were used to rinse the paste into the reaction flask. Heating was continued at 170°–180° C. for five hours and the hot slurry filtered. The insoluble product was washed repeatedly with boiling benzene to leave 7.4 grams of a white powder. Washing this powder with water left a white material (1.7 grams) melting over a broad range of 294–310° C. The neutral aqeous filtrate gave a white precipitate, insoluble in dilute nitric acid, with silver nitrate. Azide ions were shown to be present by the intense red color formed when ferric chloride is added and by decoloration of iodine in presence of a trace of sulfide ions.

The organic filtrate and washings deposited a white powder (8.3 grams; M.P. 222°–230° C.) on cooling. Distillation of the clear-filtrate and washings at low pressure left a pale yellow grease. The grease was taken up in chloroform and the solution filtered to remove a small amount of unidentified suspended matter (0.9 gram; 323°–325° C.). Petroleum ether was added to the filtered chloroform solution in order to precipitate a pale yellow resin that on repeated trituration and decantation converted into a white powder (7.1 grams melting over a broad range of 120°–170° C. with some gas evolution at 125° C.). Concentration of the chloroform-petroleum ether extracts gave additional product (1.6 grams; M.P. 170°–180° C.). The non-volatile residue from the filtrate was a soft yellow grease; treatment with acetone gave 0.5 gram of an acetone-insoluble powder M.P. 182°–186° C. The tacky residue from the filtrtae was treated with ether and 0.5 gram of an ether-insoluble powder (M.P. 115°–125° C.) was recovered. The diphenylphosphinic nitride mixture finally remaining was a soft resin essentially insoluble in water but acidic; it was also insoluble in dilute alkali.

We claim:
1. In the process of reacting sodium azide with a phenylhalophosphine at elevated temperature to form a phenylphosphinic nitride polymer, the improved process for controlling the rate of reaction which comprises forming at a temperature below about 125° C. a slurry of the sodium azide in about ¼–¾ by weight of the stoichiometric amount of the phenylhalophosphine needed to complete the reaction, maintaining the balance of the phenylhalophosphine at the elevated temperature in the range 150°–180° C. at which the reaction is to be run, and adding said slurry to said phenylhalophosphine which is maintained at said elevated temperature.

References Cited
UNITED STATES PATENTS
3,169,933  2/1965  Liu et al. _____ 260—2

JOHN D. RANDOLPH, *Primary Examiner.*
WALTER A. MODANCE, *Examiner.*
H. I. MOATZ, *Assistant Examiner.*